United States Patent [19]
Hiraoka

[11] Patent Number: 5,869,108
[45] Date of Patent: Feb. 9, 1999

[54] CONTROL SYSTEM FOR CONTROLLING A MOTOR-DRIVEN INJECTION MOLDING MACHINE

[75] Inventor: Kazuo Hiraoka, Chiba, Japan

[73] Assignee: Sumitomo Heavy Industries, Ltd., Tokyo, Japan

[21] Appl. No.: 870,485

[22] Filed: Jun. 6, 1997

[51] Int. Cl.⁶ .................................................... B29C 45/77
[52] U.S. Cl. .................... 425/145; 264/40.7; 425/149; 425/170
[58] Field of Search .................... 425/145, 149, 425/170, 171; 264/40.7

[56] References Cited

U.S. PATENT DOCUMENTS

| | | |
|---|---|---|
| 5,331,264 | 7/1994 | Cheng et al. . |
| 5,380,181 | 1/1995 | Hiraoka et al. ............. 425/145 |
| 5,421,712 | 6/1995 | Laing et al. ............... 425/145 |
| 5,494,427 | 2/1996 | Arai ..................... 425/145 |
| 5,518,390 | 5/1996 | Nakamura et al. .......... 425/145 |
| 5,723,079 | 3/1998 | Fujita et al. ............. 425/149 |

FOREIGN PATENT DOCUMENTS

| | | |
|---|---|---|
| 0 364 599 A1 | 4/1990 | European Pat. Off. . |
| 0 582 987 A1 | 2/1994 | European Pat. Off. . |
| 61-167519 | 7/1986 | Japan . |
| 2-020316 | 1/1990 | Japan . |
| 3-213323 | 9/1991 | Japan . |
| 7-052210 | 2/1995 | Japan . |
| 7-244520 | 9/1995 | Japan . |

*Primary Examiner*—Tim Heitbrink
*Attorney, Agent, or Firm*—Burns, Doane, Swecker & Mathis, LLP

[57] ABSTRACT

In a control system for controlling a motor-driven injection molding machine that comprises an injection unit driven by a servo-motor and a speed feedback control loop for controlling the servo-motor, an amplifier produces a command signal indicative of a torque command value for the servo motor in accordance with a difference between a sensed speed value obtained by a rotation speed sensor and a speed command value. A pressure sensor senses a pressure of resin within a mold to produce a sensed pressure signal indicative of a sensed pressure. A correction amplifier amplifies the sensed pressure signal to produce an amplified signal as a correction value for a torque command value. An adder adds the torque command value and the correction value to produce an addition result to a motor drive.

5 Claims, 5 Drawing Sheets

CONTROL SYSTEM FOR CONTROLLING A MOTOR-DRIVEN INJECTION MOLDING MACHINE

BACKGROUND OF THE INVENTION

The present invention relates to a control system for controlling a motor-driven injection molding machine having an injection unit that is driven by a servo-motor.

Motor-driven injection molding machines have an injection unit that is driven by a servo-motor. The injection unit comprises a ball screw, a nut, and a pressure plate. The ball screw rotates in response to rotation of the servo-motor. The nut is moved forward and backward depending on the rotation of the ball screw either in the normal or the reverse direction. The pressure plate moves forward and backward in cooperation with the nut. A screw provided within an injection cylinder moves forward and backward in response to the forward and backward movement, respectively, of the pressure plate.

As described more in detail below, the servo-motor is controlled by a speed feedback control loop. The speed feedback control loop comprises an amplifier, a motor drive, a rotation speed sensor, and a subtracter. The amplifier receives a speed command value and amplifies it to produce an output torque command value for the servo-motor. The motor drive drives the servo-motor according to the output of the amplifier. The rotation speed sensor senses a rotation speed of the servo-motor as a sensed speed value. The subtracter is provided on the side of an input of the amplifier and subtracts the sensed speed value obtained by the rotation speed sensor from the speed command value to produce a subtraction result to the speed amplifier.

The output of the amplifier that is supplied to the motor drive is a torque command value used to follow the speed command value. In such a case, a torque for acceleration or deceleration is required to accelerate or decelerate the servo-motor. The torque command value is produced by the amplifier, so that it is necessary to provide a difference between the speed command value and the sensed speed value, i.e., a speed deviation, to the amplifier. This means that the speed deviation is present when the servo-motor requires a torque. Thus the speed deviation can be used as an index for response of the speed feedback control loop.

A smaller speed deviation is preferable for better response. In principle, the speed deviation can substantially be zero if the amplifier has an infinite gain. However, it is impossible in practice. To cope with this, the gain of the amplifier may be increased to eliminate a response delay due to the speed deviation. However, a too much larger gain results in instability of the control, which adversely affects the quality of resultant molded products.

SUMMARY OF THE INVENTION

Accordingly, an object of the present invention is to provide a control system for controlling a motor-driven injection molding machine that is stable and is capable of providing high response.

A control system for controlling a motor-driven injection molding machine according to the present invention comprises an injection unit that is driven by a servo-motor and a speed feedback control loop for controlling the servo-motor. The speed feedback control loop comprises a rotation speed sensor for sensing the rotation speed of the servo-motor as a sensed speed value, an amplifier for use in producing a command signal indicative of a torque command value for the servo-motor depending on a difference between the sensed speed value and a speed command value, and a motor drive for use in controlling the servo-motor depending on the torque command value.

According to an aspect of the present invention, the control system further comprises a pressure sensor that is provided in a driving system for a screw arranged in an injection cylinder to sense a pressure of resin and produces a sensed pressure signal indicative of a sensed pressure; a correction amplifier that is connected to the pressure sensor and amplifies the sensed pressure signal to produce an amplified signal as a correction value for the torque command value; and an adder that is connected to the amplifier and the correction amplifier and adds the torque command value to the correction value to supply a result of the addition to the motor-driver.

According to another aspect of the present invention, the control system further comprises a differentiator for differentiating the speed command value to calculate an acceleration and multiplying the calculated acceleration by a predetermined coefficient to produce a result of the multiplication as a correction value for the torque command value; and an adder that is connected to the amplifier and the differentiator for adding a result of the multiplication to the torque command value produced by the amplifier to supply a result of the addition to the motor-driver.

DESCRIPTION OF THE PREFERRED EMBODIMENTS

Figure 1:
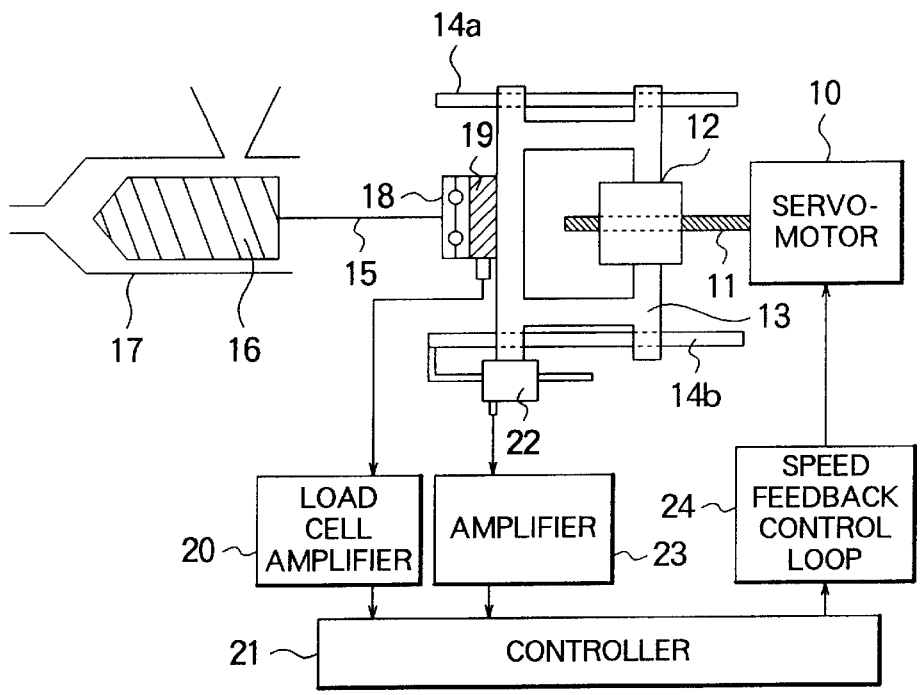
FIG. 1 is a view illustrating a schematic structure of an injection unit of a motor-driven injection molding machine.

Referring to FIG. 1, an injection unit of a motor-driven injection molding machine to which the present invention is applied is described for the purpose of facilitating the understanding of the present invention. In FIG. 1, rotation of a servo-motor 10 is transmitted to a ball screw 11. A nut 12 moves forward or backward in response to the rotation of the ball screw 11. The nut 12 is securely fixed to a pressure plate 13. The pressure plate 13 is mounted on guide bars 14a and 14b such that the pressure plate 13 is movable along the guide bars 14a and 14b. The guide bars 14a and 14b are securely fixed to a frame (not shown) of the injection molding machine. The forward or the backward movement of the pressure plate 13 is transmitted to a screw 16 through a rotation shaft 15. The screw 16 is placed within an injection cylinder 17. The rotation shaft 15 is rotation driven by a rotation driving mechanism that is not shown. Thus, a bearing 18 is provided between one end of the rotation shaft 15 and the pressure plate 13. A load cell 19 is provided adjacent to the bearing 18. The load cell 19 is for use in sensing a reactive force that acts on the screw 16 from a pressurized resin during molding of the resin.

Molding of resins typically involves in a plurality of processes, i.e., dispensing of resin, filling, dwelling, and cooling. In the dispensing process, molten resin is loaded in the injection cylinder 17. In the filling process, the molten resin is filled within a mold by means of moving the screw 16 forward in the injection cylinder 17. In the dwelling process, a pressure is applied to the molten resin filled in the mold to achieve molding. At this point, the pressure that is applied to the molten resin via the screw 16 is sensed as the reactive force by the load cell 19. The pressure sensed by the load cell 19 is amplified by a load cell amplifier 20 and is given to a controller 21.

The pressure plate 13 is provided with a position sensor 22 for sensing a travel distance of the screw 16. The position sensor 22 produces a position sensor signal. The position sensor signal is amplified by an amplifier 23 and is supplied to the controller 21. The controller 21 supplies to a speed feedback control loop 24 a torque command value for the above mentioned individual processes in accordance with settings made by an operator. The speed feedback control loop 24 controls a drive current for the servo-motor 10 based on the torque command value to control an output torque of the servo-motor 10.

Figure 2:
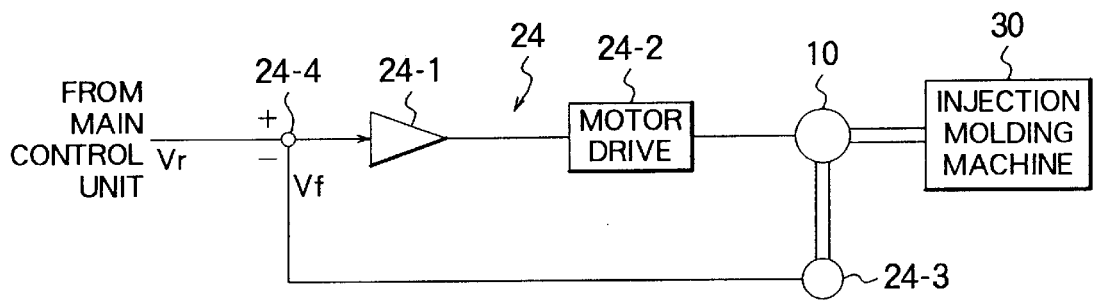
FIG. 2 is a block diagram illustrating a structure of a conventional speed feedback control loop.

Referring also to FIG. 2, a conventional speed feedback control loop is described. The speed feedback control loop 24 comprises an amplifier 24-1, a motor drive 24-2, a rotation speed sensor 24-3, and a subtracter 24-4. The amplifier 24-1 has various functions including a PID compensation. The amplifier 24-1 amplifies a speed command signal that is indicative of a speed command value Vr to produce the torque command value for the servo-motor 10. The speed command valve Vr is supplied from a main control unit (not shown) for the motor-driven injection molding machine. The motor drive 24-2 drive s the servo-motor 10 based on the torque command value supplied from the amplifier 24-1. The rotation speed sensor 24-3 senses a rotation speed of the servo-motor 10 to produce a rotation speed sensor signal that is indicative of a sensed speed value Vf. The subtracter 24-4 is provided on the side of an input of the amplifier 24-1 and subtracts the sensed speed value Vf from the speed command value Vr. The subtracter 24-4 produces a result of the subtraction to the amplifier 24-1. The injection molding machine is generally depicted by a reference numeral 30 in FIG. 2. To sense the rotation speed of the servo-motor 10 may be achieved by a well-known rotation speed observer rather than the rotation speed sensor 24-3. This is because the rotation speed of the servo-motor can be determined from values of the current and voltage applied to the servo-motor 10.

Figure 3:
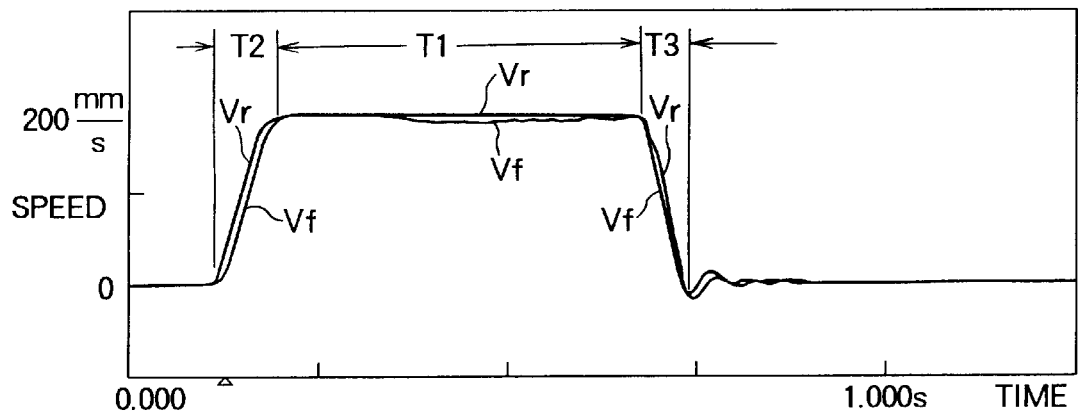
FIG. 3 shows, as a function of time, characteristic curves of a speed command value and a sensed speed value in the speed feedback control loop in FIG. 2.

The speed feedback control loop as shown in FIG. 2 may generate a disturbance load during a time interval T1 shown in FIG. 3 due to the nature and properties of the resin to be molded. When generated, the disturbance load is reflected to the sensed speed value Vf of the rotation speed sensor 24-3.

Figure 4:
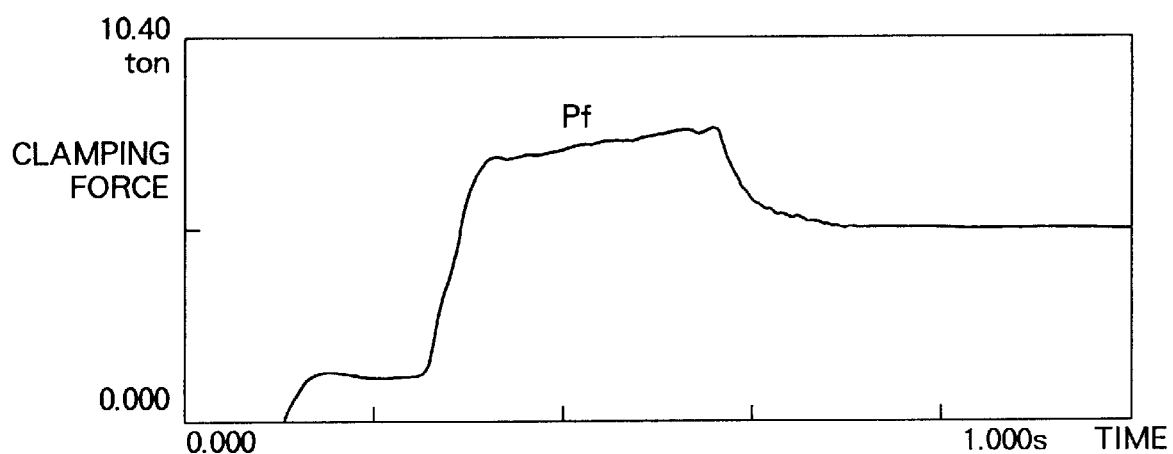
FIG. 4 is a characteristic curve of a pressure sensed by a load cell shown in FIG. 1, in which the characteristic curve is illustrated on the same basis of time as in FIG. 3.

As a result, a speed deviation is produced between the speed command value Vr and the sensed speed value Vf in the subtracter 24-4. For your reference, FIG. 4 shows a change in a pressure Pf that is sensed by the load cell 19.

It is needless to say that a smaller speed deviation is more preferable. A loop gain of the speed feedback control loop, i.e., a gain of the amplifier 24-1 may be increased in order to decrease the speed deviation. However, a larger gain results in instability of the speed feedback control loop.

The output of the amplifier 24-1 that is supplied to the motor drive 24-2 is a torque command value used to follow the speed command value Vr. In such a case, a torque for acceleration or deceleration is required to accelerate or decelerate the servo-motor 10 during an acceleration time interval T2 or a deceleration time interval T3, respectively, shown in FIG. 3. The torque command value is produced by the amplifier 24-1, so that it is necessary to provide a difference between the speed command value Vr and the sensed speed value Vf, i.e., a speed deviation, to the amplifier 24-1. This means that the speed deviation is present when the servo-motor 10 requires a torque. Thus the speed deviation can be used as an index for response of the speed feedback control loop.

A smaller speed deviation is preferable for a better response. In principle, the speed deviation can substantially be zero if the amplifier 24-1 has an infinite gain. However, it is impossible in practice. To cope with this, the gain of the amplifier 24-1 may be increased to eliminate a response delay due to the speed deviation. However, a too much larger gain results in instability of the control, which adversely affects the quality of resultant molded products.

Figure 5:
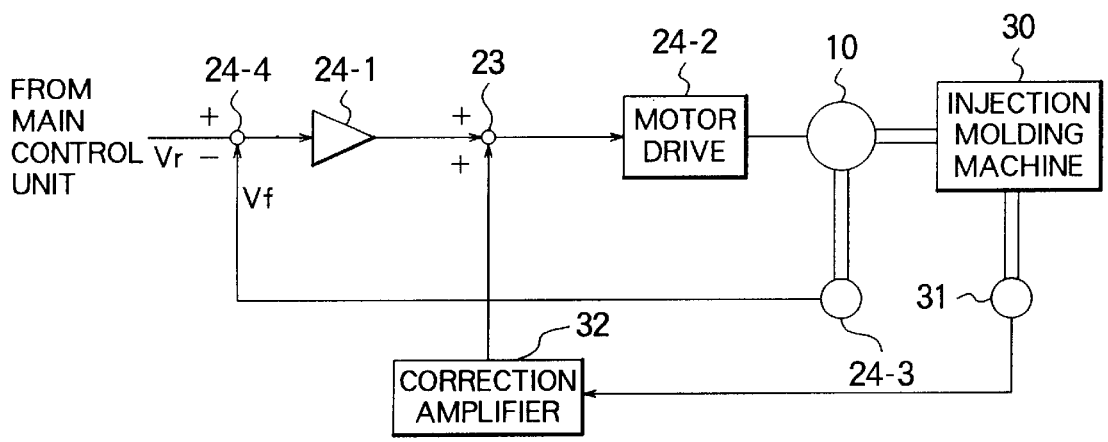
FIG. 5 is a block diagram illustrating a structure of a speed feedback control loop according to a first embodiment of the present invention.

Referring to FIG. 5, a first embodiment of the present invention is described. The first embodiment is applied to the injection unit that is illustrated in FIG. 1. Similar components and parts in FIG. 5 are indicated by the same reference numerals as in FIG. 2. In this first embodiment, a pressure sensor 31 that is realized by the load cell is provided in a driving system of the screw 16 (FIG. 1) of the injection molding machine 30. For example, the pressure sensor 31 may be provided in a portion between the pressure plate 13 and the screw 16 that is used to transmit the driving force. The pressure sensor 31 senses an injection pressure that is generated when the molten resin is filled in the mold and is pressurized by means of the screw 16. A correction amplifier 32 amplifies a pressure sensor signal produced by the pressure sensor 31. The amplified pressure sensor signal is supplied to an adder 23 that is provided between the amplifier 24-1 and the motor drive 24-2. The adder 33 adds the output of the amplifier 24-1 and the output of the correction amplifier 32 to supply a result of the addition to the motor drive 24-2.

Figure 6:
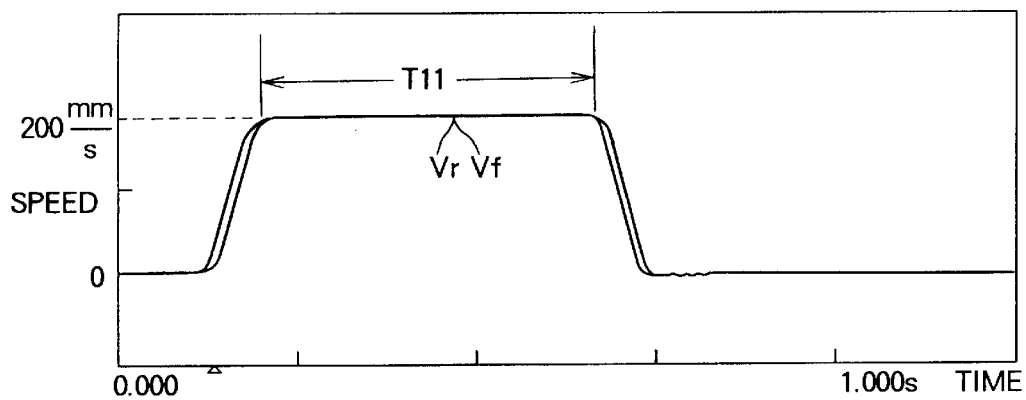
FIG. 6 shows, as a function of time, characteristic curves of a speed command value and a sensed speed value in the speed feedback control loop in FIG. 5.
Figure 7:
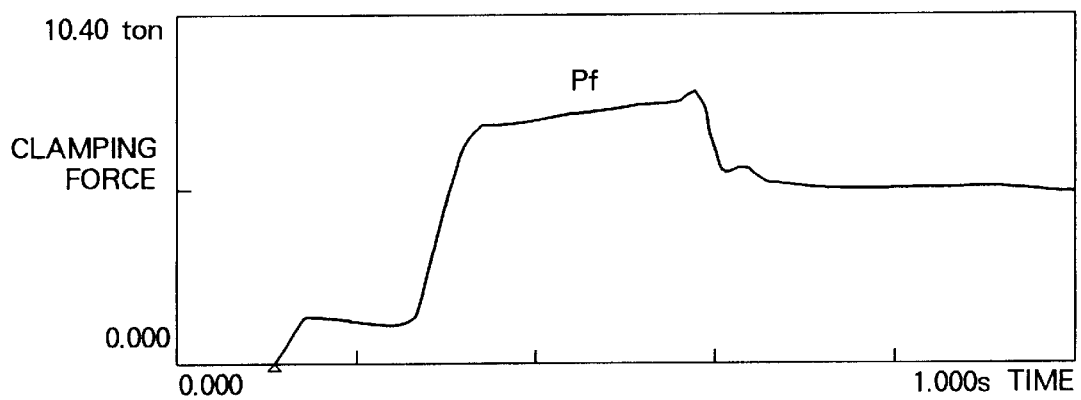
FIG. 7 is a characteristic curve of a pressure sensed by a load cell shown in FIG. 1, in which the characteristic curve is illustrated on the same basis of time as in FIG. 6.

Thus, the motor drive 24-2 is provided with the torque command value for the servo-motor 10, i.e., the output of the amplifier 24-1, that is added to the output of the correction amplifier 32. This means that the pressure value sensed by the pressure sensor 31 is used to correct the torque command value that is supplied to the motor drive 24-2. Such correction of the torque command value allows a stable, high response without any deviation between the speed command value Vr and the sensed speed value Vf, as apparent from FIG. 6. This stable and high response can be realized even when the disturbance load is generated due to the nature and properties of the resin to be mold during the time interval T11 in FIG. 6. For your reference, FIG. 7 shows the pressure sensed by the pressure sensor 31, in which the pressure is converted into a thrust force obtained by the ball screw 11.

The load cell 19 described in conjunction with FIG. 1 may be substituted for the pressure sensor 31. It is preferable that the correction amplifier 32 amplifies the pressure sensor signal supplied from the pressure sensor 31 with different gains for the forward and the backward movements of the screw 16. More specifically, the gain of the correction amplifier 32 would be a first gain G1 when the screw 16 moves forward, i.e., when the injection pressure is increased. On the other hand, the gain of the correction amplifier 32 would be a second gain G2 (where G1>G2) when the screw 16 moves backward, i.e., when the injection pressure is decreased. The first and the second gains G1 and G2 are determined depending on transmission efficiency of a driving force transmission mechanism in the injection unit.

Figure 8:
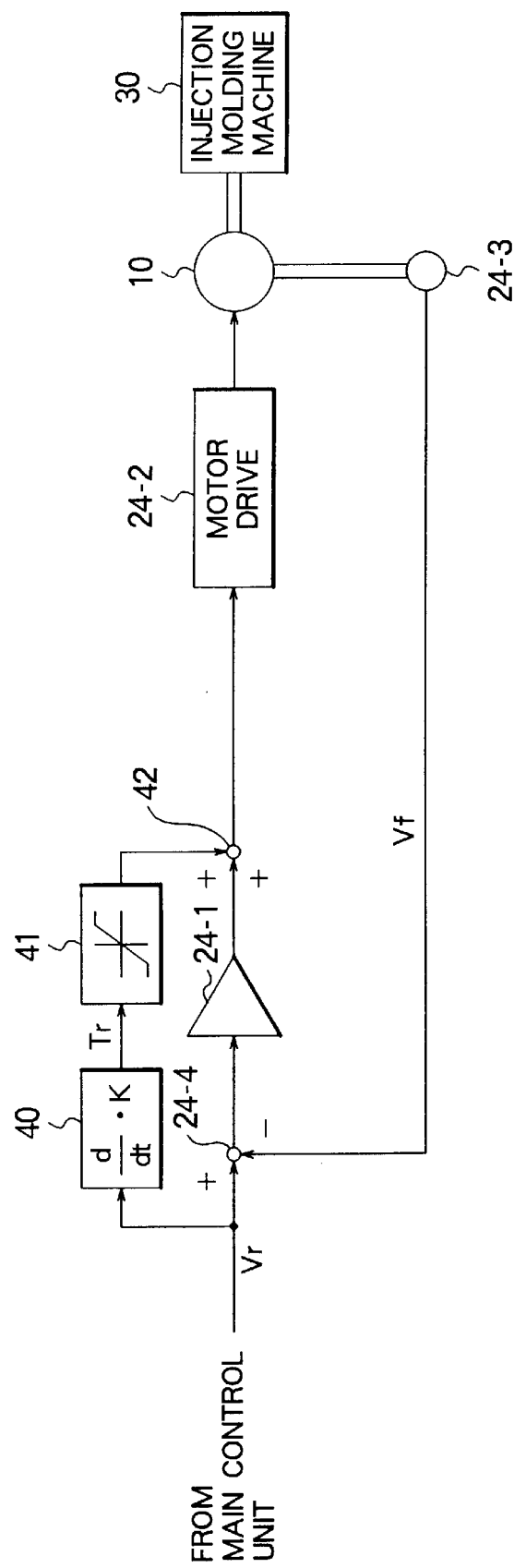
FIG. 8 is a block diagram illustrating a structure of a speed feedback control loop according to a second embodiment of the present invention.

Referring to FIG. 8, a second embodiment of the present invention is described. The second embodiment is characterized in that a differentiator 40 and an acceleration limiter 41 are provided in the speed feedback control loop that is described in conjunction with FIG. 2. More specifically, the differentiator 40 detects a change in the speed command value Vr. The differentiator 40 multiplies the detected value by a predetermined coefficient K to produce a result of the multiplication. The multiplication result is supplied to an adder 42 through the acceleration limiter 41. The adder 42 adds the multiplication result to the output of the amplifier 24-1 to supply a result of the addition to the motor-driver 24-2. The acceleration limiter 41 is described more in detail below.

Figure 9:
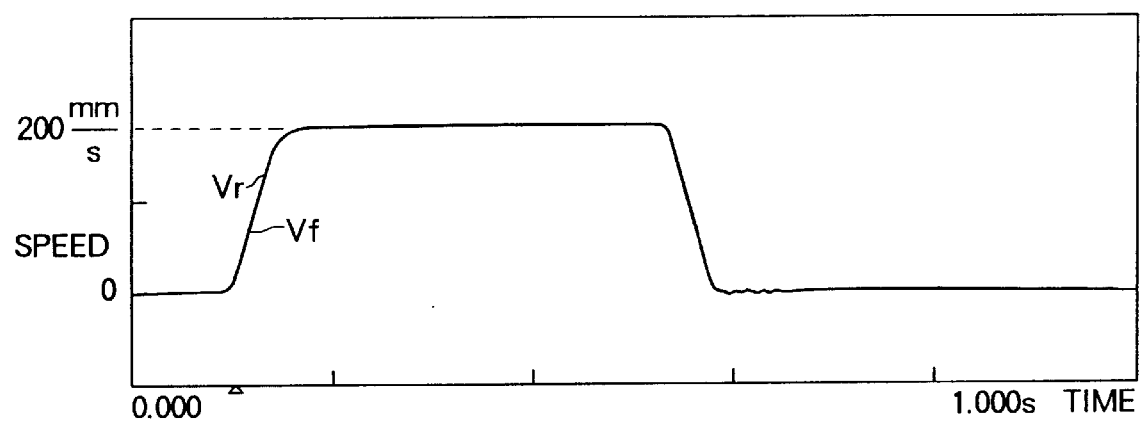
FIG. 9 shows, as a function of time, characteristic curves of a speed command value and a sensed speed value in the speed feedback control loop in FIG. 8.

In the injection molding machine, a moment of inertia does not vary that is to be driven by the servo-motor 10 of the injection unit. Therefore, the acceleration torque and the deceleration torque that are required for the servo-motor 10 have a constant value relative to the change in the speed command value Vr, i.e., the acceleration. Thus, it is possible to previously calculate the acceleration torque and the deceleration torque that are necessary with respect to the speed command value Vr. This calculation can be made by means of taking the advantage of the feature that moment of inertia to be driven by the servo-motor 10 of the injection unit does not vary. A torque command value Tr can be obtained by the following. The coefficient K is previously calculated, that is an inertia of the injection molding machine. The change in the speed command value Vr is then calculated as a differentiation value and the differentiation value is multiplied by the coefficient K by the differentiator 40. The calculated torque command value Tr is added to the command value to the motor drive 24-2 by the adder 42. A result of the addition is supplied to the motor drive 24-2. This eliminates the necessity for the speed deviation and, as shown in FIG. 9, the speed feedback control loop can be obtained without any response delay.

Next, functions of the acceleration limiter 41 are described. In the motor-driven injection molding machine, the speed feedback control loop as shown in FIG. 8 may be used not only for the speed control but also various other controls including a minor loop for an injection pressure control system or a position control system for the screw 16. The range of the acceleration in which the motor-driven injection molding machine can respond is previously known from the inertia and the maximum torque that the servo-motor 10 can generate. It is possible to obtain the speed feedback control loop that can follow the speed command value Vr within a certain specific range of the change rate (or a certain specific range of acceleration). This is achieved by means of limiting the torque command value Tr with the upper and the lower limit values of the acceleration range used as a limit value.

What is claimed is:

1. A control system for controlling a motor-driven injection molding machine comprising an injection unit that is driven by a servo-motor and a speed feedback control loop for controlling the servo-motor, said speed feedback control loop comprising a rotation speed sensor for sensing a rotation speed of the servo-motor as a sensed speed value, an amplifier for use in producing a command signal indicative of a torque command value for the servo-motor depending on a difference between the sensed speed value obtained by said rotation speed sensor and a speed command value, and a motor drive for use in controlling the servo-motor depending on the torque command value, said control system further comprising:

a pressure sensor that is provided in a driving system for a screw arranged in an injection cylinder to sense a pressure of resin and produces a sensed pressure signal indicative of a sensed pressure;

a correction amplifier that is connected to said pressure sensor and amplifies the sensed pressure signal to produce an amplified signal as a correction value for the torque command value; and adding means that is connected to said amplifier and said correction amplifier and adds the torque command value to the correction value for the torque command value to supply a result of the addition to said motor-driver.

2. A control system for controlling a motor-driven injection molding machine as claimed in claim 1, wherein said correction amplifier amplifies the sensed pressure signal with a first gain G1 when the screw moves forward and amplifies the sensed pressure signal with a second gain G2 when the screw moves backward, the second gain G2 being smaller than the first gain G1.

3. A control system for controlling a motor-driven injection molding machine comprising an injection unit that is driven by a servo-motor and a speed feedback control loop for controlling the servo-motor, said speed feedback control loop comprising a rotation speed sensor for sensing a rotation speed of the servo-motor as a sensed speed value, an amplifier for use in producing a command signal indicative of a torque command value for the servo-motor depending on a difference between the sensed speed value and a speed command value, and a motor drive for use in controlling the servo-motor depending on the torque command value; said control system further comprising:

a differentiator for differentiating the speed command value to calculate an acceleration and multiplying the calculated acceleration by a predetermined coefficient to produce a result of the multiplication as a correction value for the torque command value; and an adder that is connected to said amplifier and said differentiator for adding a result of the multiplication to the torque command value produced by said amplifier to supply a result of the addition to the motor-driver.

4. A control system for controlling a motor-driven injection molding machine as claimed in claim 3, further comprising an acceleration limiter that is connected between said differentiator and said adder, said limiter allowing only a signal within a predetermined range of acceleration to pass through said limiter.

5. A control system for controlling a motor-driven injection molding machine as claimed in claim 4, wherein the predetermined coefficient and the predetermined range of acceleration are determined for a situation where a moment of inertia of the servo-motor becomes minimum.

* * * * *